United States Patent [19]
Corcoran et al.

[11] Patent Number: 5,761,917
[45] Date of Patent: Jun. 9, 1998

[54] METHOD AND APPARATUS FOR CONTROLLING THE CLUTCH OF AN AIR CONDITIONING COMPRESSOR ON AN AUTOMOTIVE VEHICLE

[75] Inventors: William Clayton Corcoran, Dearborn Heights; Steven John Bigham, Canton; Vasant Babaldas Patel, Taylor; Darwin Allen Becker, Livonia, all of Mich.

[73] Assignee: Ford Global Technologies, Inc., Dearborn, Mich.

[21] Appl. No.: 678,207

[22] Filed: Jul. 11, 1996

[51] Int. Cl.⁶ .................................................. B60H 1/32
[52] U.S. Cl. ............................. 62/133; 62/158; 62/323.4
[58] Field of Search ........................... 62/133, 157, 158, 62/231, 243, 323.4

[56] References Cited

U.S. PATENT DOCUMENTS

| | | |
|---|---|---|
| 4,135,368 | 1/1979 | Mohr et al. ............................ 62/133 |
| 4,556,942 | 12/1985 | Russo et al. ........................ 62/133 X |
| 4,658,943 | 4/1987 | Nishikawa et al. .................. 62/133 X |
| 4,823,555 | 4/1989 | Ohkumo ................................ 62/243 X |
| 5,050,395 | 9/1991 | Berger ................................... 62/158 X |
| 5,199,272 | 4/1993 | Yamanaka et al. ................... 62/133 |
| 5,216,895 | 6/1993 | Kawai et al. ......................... 62/133 |
| 5,347,824 | 9/1994 | Kato et al. ........................... 62/133 |
| 5,415,004 | 5/1995 | Iizuka .................................. 62/133 |
| 5,469,947 | 11/1995 | Anzai et al. ......................... 62/133 X |
| 5,546,755 | 8/1996 | Krieger ................................ 62/133 |

FOREIGN PATENT DOCUMENTS 0 199 536 A2   4/1986   European Pat. Off. .

*Primary Examiner*—Harry B. Tanner
*Attorney, Agent, or Firm*—Paul K. Godwin

[57] ABSTRACT

An air conditioner compressor clutch control that senses operator demands for acceleration from low vehicle speeds and several other variables, to release the engagement of the clutch for a period of time that is dependent on vehicle speed, throttle position or a maximum time period.

9 Claims, 3 Drawing Sheets

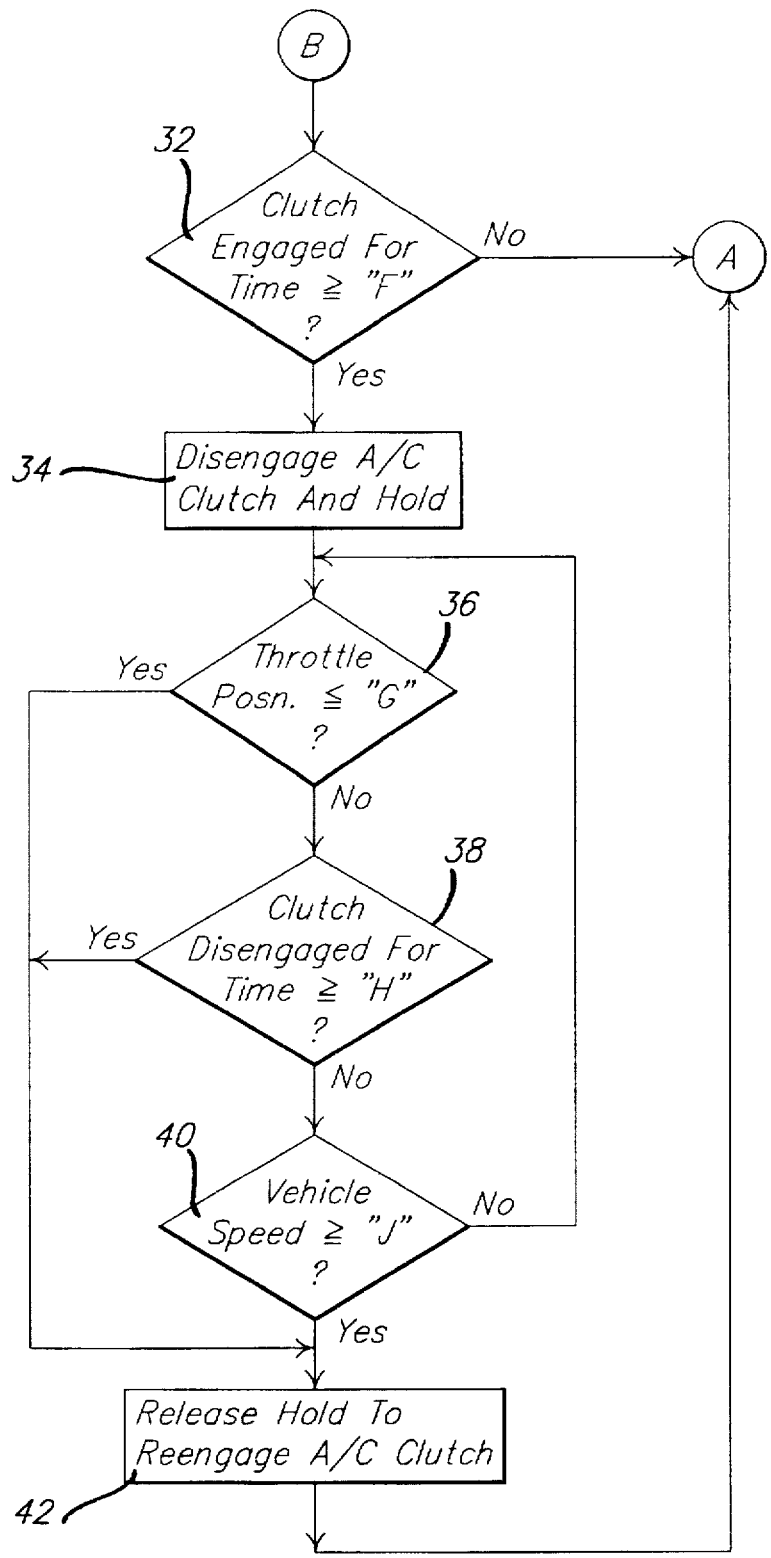

METHOD AND APPARATUS FOR CONTROLLING THE CLUTCH OF AN AIR CONDITIONING COMPRESSOR ON AN AUTOMOTIVE VEHICLE

BACKGROUND OF THE INVENTION

The present invention is directed to the field of automotive air conditioners and more particularly to the area of control methodology for the clutch of an air conditioning compressor under certain vehicle operating conditions.

Under certain vehicle operating conditions, the load presented by an operating air conditioner compressor on an engine can become large enough to adversely affect the ability of the engine to accelerate the vehicle from a stop to desired speeds within an acceptable time period. This is most evident on a vehicle with a low engine-power-to-vehicle-weight ratio, as well as a vehicle with a compressor that requires a large percentage of available engine output power to operate at engine idle speeds. Conventionally, when the air conditioner system is turned on, the compressor clutch of an air conditioner is continually engaged throughout the operating cycle of the engine. In some cases, air conditioning clutches are controlled by systems that disengage the clutch when a wide open throttle is sensed or when heavy acceleration demand is sensed by a reduction in manifold vacuum. In some cases, clutches are disengaged when the engine is idling and until the engine throttle is manually or automatically adjusted to produce at least a predetermined engine speed.

SUMMARY OF THE INVENTION

The present invention provides a novel method of controlling the electromagnetically engageable compressor clutch under certain vehicle and engine operating conditions, such as part-throttle launch conditions. A part throttle launch condition is defined as an acceleration demand that occurs when an engine is at or nearly at an idle speed and the vehicle is stopped or nearly stopped. The acceleration demand in such a condition is that the throttle is at a position that is less than fully open, and involves moving the throttle with a rate of increase that is more than that which is required for a moderate acceleration. Upon satisfying a unique set of conditions, the present invention causes the electromagnetic clutch that is located between the vehicle engine and the compressor of the air conditioner (A/C) system to be disengaged. Another unique set of conditions must be satisfied to reengage the A/C clutch. The logic described herein results in minimal disruption to the cooling performance of the A/C system, while allowing a marked improvement in launch performance feel to the vehicle operator.

BRIEF DESCRIPTION OF THE DRAWINGS

FIGS. 2A and 2B constitute a flow diagram of the process used by the invention.

DETAILED DESCRIPTION OF THE PREFERRED EMBODIMENT

Figure 1:
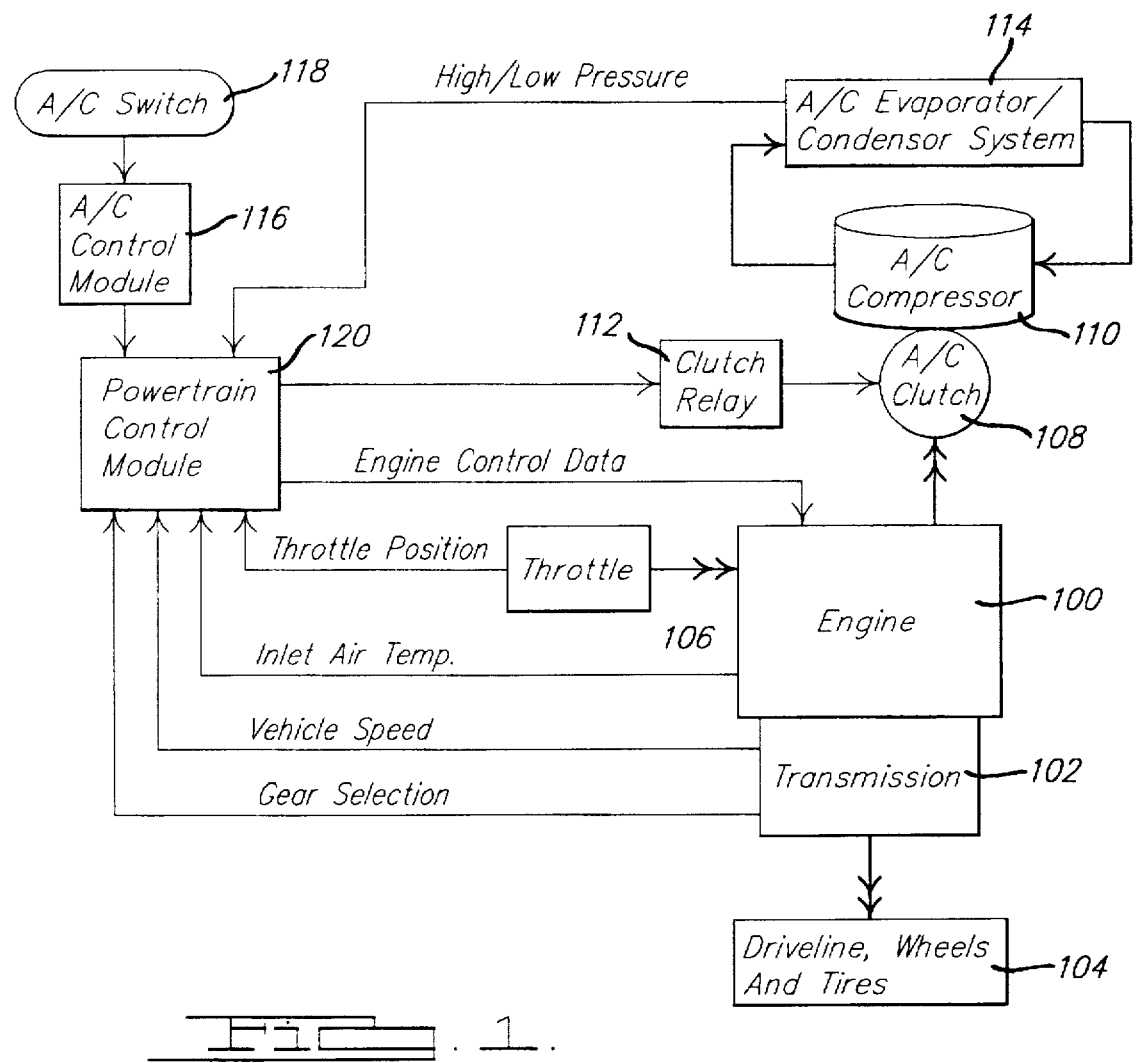
FIG. 1 is a block diagram of the present invention embodied in an automotive vehicle system.

The purpose of the present invention is to provide an improved means for controlling an air conditioning clutch that is part of an automotive passenger compartment cooling system. A direct result of the invention is an improvement in vehicular acceleration or perceived performance feel. A passenger compartment cooling system of an automotive vehicle is shown in FIG. 1 and consists of a conventional compressor 110, an evaporator, an expansion valve, an accumulator and a condenser (collectively represented as 114), all of which are connected by hoses or metallic tubes. Heat is transferred from the passenger compartment of the vehicle to the surrounding environment by a circulated refrigerant. The air conditioning system operation is basically controlled or requested by means of an electrical switch 118 mounted on the instrument panel of the vehicle. An A/C control module 116 activates a clutch relay 112 either directly or through a powertrain control module such as shown in FIG. 1. When activated, the relay applies power to engage the electromagnetic clutch A/C 108. When A/C clutch 108 is engaged, the engine 100 provides direct mechanical power (usually through a drive belt) to compressor 110. When powered, compressor 110 drives the closed cooling cycle by compressing the refrigerant.

In the present invention, A/C clutch 108 is disengaged when a set of conditions warrant such action. This action is judged from information received from various engine and transmission sensors that indicate the occurrence of a defined part-throttle launch condition. When A/C clutch 108 is disengaged, the air conditioning compressor load is removed from the engine. Therefore, engine power that was used to drive the compressor is now made available to transmission 102, and drivetrain, wheels and tires 104. The net result is an increase in tractive force at the tires/road contact point which propels the vehicle at an increased acceleration rate. Once the vehicle has accelerated, a second set of conditions prescribe when A/C clutch 108 may be reengaged. This action is also judged from engine and transmission sensors that indicate that the vehicle has attained an acceptable speed and that compressor load may resume.

In FIG. 1, compressor 110 is mechanically powered by engine 100 through a belt-driven A/C clutch 108. A/C clutch 108 is electrically actuated through a clutch relay 112 or other type of electrical switching device. The actuation of clutch relay 112 is controlled by an electrical signal that is generated by a powertrain control module 120. A/C clutch control signal output from the powertrain control module 120 is the direct result of a decision from the A/C launch cutout algorithm of the present invention.

Engine 100, which drives air conditioning compressor 110, is also mechanically connected to transmission 102. Engine 100 contains a plurality of sensors which provide information to powertrain control module 120. Powertrain control module 120, in turn, provides engine control data to engine 100. However, in this case, FIG. 1 only shows the inlet air temperature as being sensed by engine 100 and provided to powertrain control module 120. Engine 100 includes a throttle 106 that is usually configured to be actuated by a foot pedal that is depressed by the vehicle operator (sometimes referred to as "driver") to control the engine speed and resultant power output to the transmission 102 and drivetrain 104. Throttle 106 includes a position sensor typically that provides position information to powertrain control module 120. The throttle position sensor typically measures the rotation of an air inlet throttle plate. The throttle plate opens due to movement of the mechanically connected foot pedal. The amount of throttle pedal movement is directly related to the engine power demanded by the driver.

The transmission 102 also contains a plurality of sensors which provide information to powertrain control module 120. The transmission sensors utilized by the present invention include a gear engaged indicator switch and a vehicle speed sensor. The sensor outputs are received and processed by powertrain control module 120 and are used as inputs to the A/C clutch cutout algorithm.

Additional sensor inputs to powertrain control module 120 include refrigerant pressure values from A/C System 114, that may include preset high and low pressure switches placed in strategic locations to indicate the relative load the A/C system may be presenting to engine.

Figure 2A:
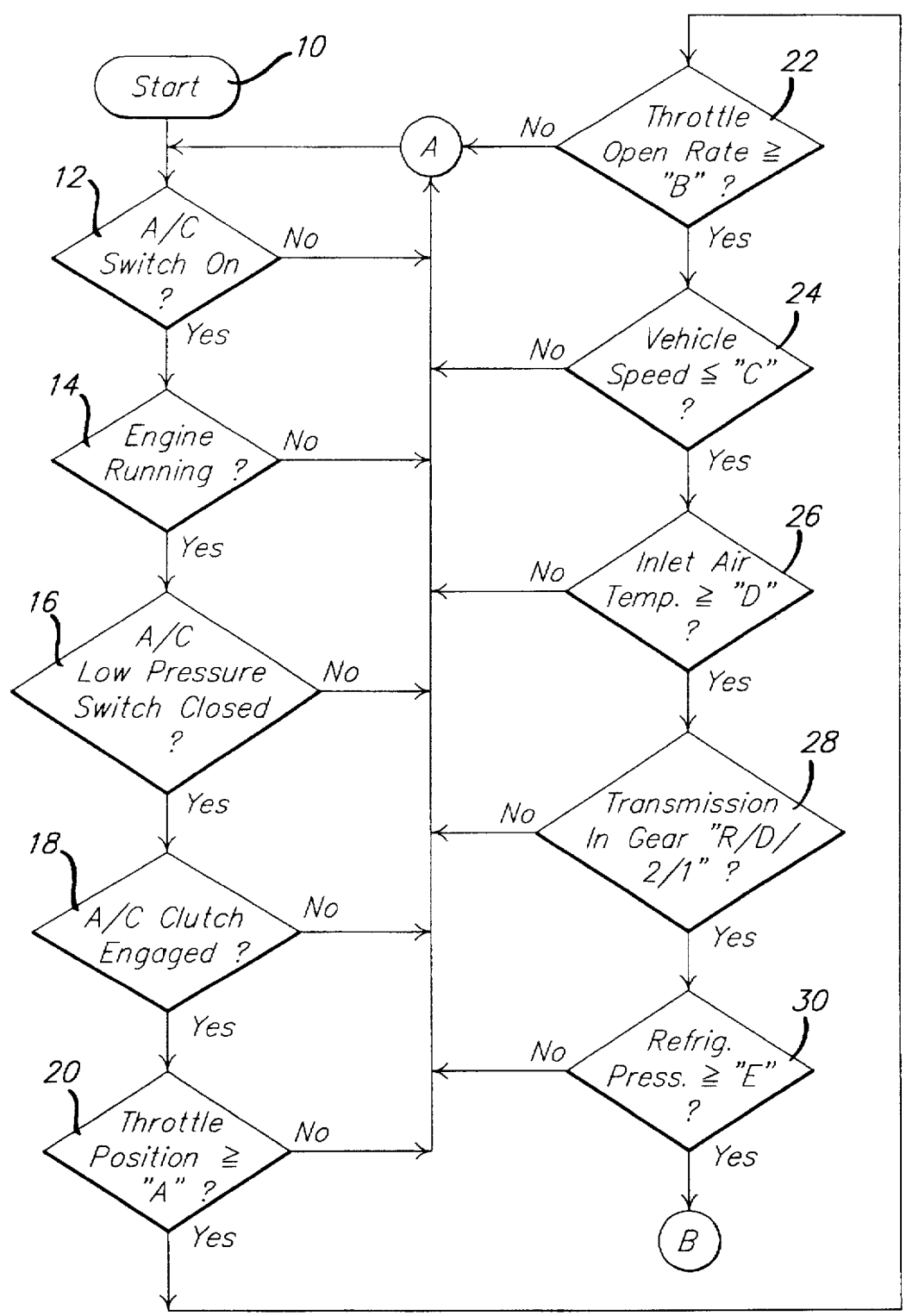

In FIGS. 2A and 2B, the method by which powertrain controller 120 makes decisions concerning the release or reengagement of A/C clutch 108 is shown as a flow diagram. This method is continuously run as part of the routines that powertrain control module 120 uses to operate engine 100 and transmission 102. When the command to disengage A/C clutch 108 is determined from the cutout algorithm, the A/C clutch control signal will cause A/C clutch relay 112 to disengage A/C clutch 108, removing A/C compressor 110 load from engine 100. The power from engine 100 that was previously used to drive A/C compressor 110 is now available to transmission 102 and driveline, wheels and tires 104. This will have the effect of allowing the vehicle to be propelled forward with the feel to the operator of acceptable performance. When the command to reengage A/C clutch 108 is determined from the cutout algorithm, the A/C clutch control signal will then cause A/C clutch relay 112 to reengage A/C clutch 108, allowing A/C compressor 110 to again be driven by engine 100. Passenger compartment cooling will then resume.

Referencing the flow diagram of FIG. 2A, the algorithm starts at step 10 and checks a number of events to determine if it is necessary to disengage A/C clutch 108. At step 12, A/C switch 118 is checked to see if A/C system is turned on. If A/C switch 118 is on, step 14 is performed to see if engine 100 is running. Powertrain control module 120 has a number of inputs that it can check to determine if the engine is running, including engine speed, vacuum level, spark activity or alternator output. Once it is determined that engine 100 is running, step 16 is performed to determine if the low pressure switch of the A/C system is closed. If closed, the system is operating normally.

At step 18, a determination is made as to whether or not A/C clutch 108 is engaged. Under normal circumstances when A/C switch 118 is on and engine 100 is running, A/C clutch 108 should be engaged. The engagement of the clutch can be checked in a number of ways, including monitoring the clutch relay current or the clutch current or with a sensor switch mounted within the clutch itself. If it is determined that A/C clutch 108 is not engaged, then the algorithm is restarted at step 12. After these preliminary steps, the system looks at the throttle position in step 20 to determine if it is equal to or greater than a threshold "A." In this embodiment threshold A is set at approximately 25% of the "wide open throttle" (WOT) position, wherein the idle setting is 0% and the WOT position is defined as 100%. If the throttle setting is less than threshold A, then A/C clutch 108 remains engaged and the algorithm is restarted. If the throttle setting is equal to or more than threshold A, a check is then made at step 22 to determine if throttle 106 is being opened at a rate that is equal to or more than a threshold "B." This determination of rate is typically performed by sampling the throttle position at several points in time and calculating the rate from position changes occurring over the sample period. In this embodiment, a sampling rate of once every 50 milliseconds is used and threshold B is set at approximately 150%/sec. If threshold B is met or exceeded, a check is then made at step 24 to determine if vehicle speed is less than or equal to a threshold "C." In this embodiment, vehicle speed is measured by the speed sensor located in transmission 102 and threshold C is set at approximately 15 mph. If the vehicle speed affirmatively meets threshold C determination in step 24, a check is then made to determine if air inlet temperature at engine 100 is greater than or equal to a threshold "D." In this embodiment, air inlet temperature threshold D is set at approximately 100° F. and is an indication of ambient air temperature. If the air inlet temperature is equal to or in excess of threshold D, a check is then made in step 28 to determine if transmission 102 is in gear as opposed to being in Park or Neutral (out of gear). Transmission 102 has a gear shift position sensor and the output is provided to powertrain control module 120 for this purpose. If transmission 102 is in R (reverse), D (drive), 2 (second) or 1 (first) gears, then step 30 is performed. In step 30, a measurement is made to see if refrigerant pressure at the compressor is greater than or equal to a threshold "E." In this embodiment, threshold E is set to 450 psi in a range of pressures that typically can range from 50 psi to 250 psi. The greater the pressure buildup in the A/C system, the greater the load on the compressor and the engine when the clutch is engaged. If threshold E is met, step 32 (see FIG. 2B) is performed to determine if A/C clutch 108 has been engaged for at least a minimum amount of time. In this embodiment, that minimum time period is a threshold "F" that is set at approximately 5 seconds. This factor is used to ensure that A/C clutch 108 will not be pulsed on and off at rapid intervals and to provide some degree of operating ability for the A/C system after the clutch is engaged.

If all the foregoing conditions are met, then A/C clutch 108 is disengaged and held disengaged in step 34. This disengagement means a release of the energizing power applied to clutch relay 112, which in turn de-energizes A/C clutch 108. Upon disengagement of clutch 108, the compressor load is removed from engine 100. This load removal allows the vehicle to accelerate for a relatively short period at an acceptable rate without the suffering from the added burden of also driving the A/C system.

Once A/C clutch 108 is disengaged upon order of the powertrain control module 120, several steps are then taken to determine when to reengage the clutch. In this embodiment, if any one of the variables are satisfied A/C clutch 108 is allowed to be reengaged. A check is made at step 36 to determine if throttle position is less than or equal to a predetermined position "G." In this embodiment, throttle position G is defined as approximately 20% WOT, which is less than the setting defined for throttle position A. If the throttle position meets the determination of step 36 in the affirmative, step 42 is performed which releases the hold set by step 34 and A/C clutch 108 is allowed to be reengaged. If the throttle remains above position G, A/C clutch 108 remains held disengaged and step 38 is performed. Step 38 is used to determine if A/C clutch 108 has been disengaged for an amount of time greater than or equal to a threshold "H." In this embodiment, threshold H is set as approximately 7 seconds. If threshold H is affirmatively determined, step 42 is performed and the A/C clutch is reengaged. If the time period for disengagement is less than 7 seconds, A/C clutch 108 remains disengaged, and the vehicle speed is checked in step 40 to determine if it is greater than or equal to a threshold "J." In this embodiment, threshold J is set to approximately 20 mph, which is greater than the speed value for threshold C. If the speed of the vehicle meets the requirements of step 40 then A/C clutch 108 is allowed to reengage at step 42 and allow the A/C cooling system to resume operation and cool the vehicle passenger compartment. However, if the speed of the vehicle remains below threshold J, then steps 36, 38 and 40 are repeated until one of the variables in those steps is determined to be in the affirmative.

It can be seen that significant progression through the method steps of FIGS. 2A and 2B is made only if A/C clutch 108 is engaged in the first place. Then the method determines if the driver has depressed the throttle pedal and thus, opened the throttle plate sufficiently to warrant part-throttle clutch disengagement. If throttle position is less than position A, it is inferred that the driver is launching the vehicle slowly from a stop and does not require the extra power used by A/C compressor 110. If the throttle position is greater than or equal to position A, it is inferred that the driver demands additional power to sufficiently launch the vehicle from a stop or slow speed. Step 22 ensures that the driver is opening the throttle at a rate that signifies a desire to launch the vehicle in a timely manner. If throttle opening rate is less than rate threshold B, it is inferred that the driver is performing a slow depression of the throttle pedal and does not require the extra power used by A/C compressor 110. Therefore, it can be seen that both throttle position and throttle opening rate are necessary variables to define the intentions of driver demand. Throttle position alone does not define the demand of the driver since there is no determination of how long it took to achieve a certain throttle position. Likewise, a throttle opening rate alone does not characterize the demand of the driver, since high throttle opening rates are possible with very small throttle movements. Such small throttle movements do not necessarily indicate driver demand for power. Launches in which drivers demand extra power for adequate vehicle acceleration are typically characterized by moderate to high throttle opening rates and moderate to high throttle positions, both measured on a relative scale.

Step 24 ensures that the system can disengage A/C clutch 108 only if the vehicle's speed is low or if the vehicle is stopped. A majority of vehicle launches are performed from a completely stopped position. However, vehicle launches may occur while the vehicle is creeping along in traffic or during parking lot maneuvers. Thus, step 24 does not require that vehicle speed be exactly zero. Instead, the system has the flexibility to accomplish a clutch cutout for most low speed driving conditions.

Step 26 determines if the temperature of the air inducted into the engine is high enough to assume that the load on the air conditioning compressor is significant. The compressor load on the engine is typically higher under higher ambient temperature conditions. If engine inlet air temperature is less than threshold D, it is inferred that the ambient temperature is relatively low, and thus the air conditioning compressor load is low enough to allow satisfactory launch acceleration with A/C clutch 108 remaining engaged.

Step 28 ensures that transmission 102 is in gear to utilize the reallocated engine power to propel the vehicle forward (or backward, if in reverse). If the transmission is in either the Park or Neutral position, there is no need to disengage the A/C clutch.

Step 30 is a check to determine the pressure of the circulating refrigerant. The compressor load is typically higher with increased refrigerant pressures. A refrigerant pressure less than threshold E infers that the load is not significant and the disengagement of A/C clutch is not necessary.

Finally, step 32 ensures that the compressor is not repeatedly disengaged in stop-and-go traffic. A/C clutch 108 must remain on for a minimum amount of time of at least threshold F to allow for adequate cooling performance.

Steps 36, 38 and 40 collectively define alternative minimum requirements to release the hold and reengage A/C clutch 108 after a part-throttle vehicle launch has caused A/C clutch 108 to be disengaged. Step 36 determines that the driver has reduced the amount of throttle opening to a position less than or equal to G. A typical launch from stop or slow vehicle speeds causes the throttle to be positioned at a relatively large throttle opening position and as the vehicle accelerates to a desired speed, the throttle opening is reduced to a smaller relative opening position.

Step 38 ensures that A/C clutch 108 is not allowed to remain disengaged for a time greater than threshold H. If the clutch remains disengaged beyond threshold H, then vehicle cooling performance will degrade.

Alternatively, step 40 represents a check that the vehicle has achieved a minimum speed greater than or equal to threshold J. At this speed A/C clutch 108 can be reengage and the load reapplied to engine 100 without adversely affecting vehicle performance. It is assumed that once this speed has been reached, the launch is complete and the vehicle has approached its steady state speed.

This invention can be adapted to various types of vehicles with varying hardware configurations. The calibrated positions A and G and thresholds B, C, D, E, F, H and J are determined by calculations and testing based on factors such as vehicle weight, transmission gear ratios, final drive ratio, throttle body design, throttle cam design, throttle pedal design, air conditioning compressor design, engine power output, transmission type (automatic or manual), torque converter design, ambient temperature and atmospheric pressure.

It should be understood that the present invention described herein is illustrative. Therefore, the terminology used is intended to be in the nature of words of description rather than limitation. It should be further understood that many modifications and variations of the present invention are possible in light of the above teachings. Therefore, it is believed that, within the scope of the appended claims, the present invention may be practiced otherwise than as specifically described.

We claim:

1. An air conditioner compressor clutch control system for an automotive vehicle that includes an engine that is mechanically connected to drive an air conditioning compressor through an electrically energized clutch mechanism, comprising:

air conditioner control means for energizing said clutch when said engine is running and said air conditioner is turned on;

throttle means connected to said engine and being adjustable by a vehicle operator for controlling the power output of said engine;

means connected to said throttle for sensing the relative position of said throttle throughout its adjustable range;

means on said vehicle for measuring the speed said vehicle is traveling;

control means connected to said throttle position sensing means, said vehicle speed measuring means and said control means for de-energizing said clutch when said throttle position has been adjusted past a first predetermined position and said vehicle speed is below a first predetermined speed value; and said control means samples said throttle position over several predetermined time periods, calculates the rate of change of said throttle over said several sample periods and de-energizes said clutch when said throttle position has been adjusted past a first predetermined position, said vehicle speed is below a first predetermined speed value and said throttle rate of change exceeds a first predetermined rate value.

2. An air conditioner compressor clutch control system as in claim 1, wherein said control means monitors the time said clutch has been energized by said air conditioner control means and deenergizes said clutch when said throttle position has been adjusted past a first predetermined position, said vehicle speed is below a first predetermined speed value, said throttle rate of change exceeds a first predetermined rate value and said clutch has been energized continuously for a at least a first predetermined period of time.

3. An air conditioner compressor clutch control system as in claim 1, wherein said control means allows said clutch to be reenergized, following said control means deenergizing said clutch, when the throttle position is returned to below a second position or the vehicle speed reaches a second predetermined speed value.

4. An air conditioner compressor clutch control system as in claim 1, wherein said control means monitors said throttle position, said vehicle speed and time following the clutch being deenergized by said control means and allows said clutch to be reenergized when the throttle position is returned to below a second position, the vehicle speed reaches a second predetermined speed value, or said clutch being deenergized by said control means for a period of time that exceeds a second predetermined period of time.

5. An apparatus for controlling an electromagnetically powered clutch of an air conditioning compressor on an automotive vehicle, wherein said compressor is mechanically driven through said clutch by an engine that also powers said automotive vehicle, said system comprising:

air conditioner control means for electrically energizing said clutch when said engine is running and said air conditioner is turned on;

throttle means connected to said engine and being manually adjustable over a predetermined range of positions by a vehicle operator for controlling the powerout of said engine;

means connected to said throttle for sensing the relative position of said throttle throughout its adjustable range;

means on said vehicle for measuring the speed said vehicle is traveling;

control means connected to said throttle position sensing means, said vehicle speed measuring means and said control means for deenergizing said clutch when said throttle position has been adjusted above a first predetermined position and said vehicle speed is below a first predetermined speed value; and said control means allows said clutch to be reenergized when the throttle position is returned to below a second position that is lower than said first position, the vehicle speed reaches a second predetermined speed value that is greater than said first value, or said clutch being deenergized by said control means for a period of time that exceeds a predetermined maximum deenergized period of time.

6. A method of controlling an electromagnetically powered clutch of an air conditioning compressor on an automotive vehicle, wherein said compressor is mechanically driven through said clutch by an engine that also powers said automotive vehicle, said method comprising the steps of:

providing an air conditioner control means for electrically energizing said clutch when said engine is running and said air conditioner is turned on;

providing throttle means connected to said engine and being adjustable over a predetermined range of positions by a vehicle operator for controlling the power output of said engine;

providing means connected to said throttle for sensing the relative position of said throttle throughout its adjustable range;

providing means on said vehicle for measuring the speed said vehicle is traveling;

monitoring said throttle position;

monitoring said vehicle speed;

de-energizing said clutch when said throttle position has been adjusted above a first predetermined position and said vehicle speed is below a first predetermined speed value;

monitoring the time said clutch is continuously deenergized; and re-energizing said clutch when the throttle position is returned to below a second position that is lower than said first position, the vehicle speed reaches a second predetermined speed value that is greater than said first value, or said clutch being de-energized for a period of time that exceeds a predetermined maximum de-energized period of time.

7. A method as in claim 6, further including the steps of:

monitoring the ambient air temperature and performing said deenergizing step if, additionally, said ambient temperature is sensed as being above a first predetermined value.

8. A method of disconnecting an electrical/mechanical load from the engine of an automotive vehicle, wherein said electromechanical load is electrically controlled for mechanical connection to said engine, comprising the steps of:

providing means for electrically disconnecting said load when said engine is running;

providing throttle means connected to said engine and being adjustable over a predetermined range of positions by a vehicle operator for controlling the power output of said engine;

providing means connected to said throttle for sensing the relative position of said throttle throughout its adjustable range;

providing means on said vehicle for measuring the speed said vehicle is traveling;

monitoring said throttle position;

monitoring said vehicle speed;

disconnecting said load when said throttle position has been adjusted above a first predetermined position and said vehicle speed is below a first predetermined speed value;

monitoring the time said load is continuously disconnected from said engine; and reconnecting said load when the throttle position is returned to below a second position that is lower than said first position, the vehicle speed reaches a second predetermined speed value that is greater than said first value, or said load is disconnected for a period of time that exceeds a predetermined maximum disconnection period of time.

9. A method of disconnecting an electrical/mechanical load from the engine of an automotive vehicle, wherein said electromechanical load is electrically controlled for mechanical connection to said engine, comprising the steps of:

providing means for electrically disconnecting said load when said engine is running;

providing throttle means connected to said engine and being adjustable over a predetermined range of positions by a vehicle operator for controlling the power output of said engine;

providing means connected to said throttle for sensing the relative position of said throttle throughout its adjustable range;

providing means on said vehicle for measuring the speed said vehicle is traveling;

monitoring said throttle position;

monitoring said vehicle speed;

disconnecting said load when said throttle position has been adjusted above a first predetermined position and said vehicle speed is below a first predetermined speed value;

monitoring the time said load is continuously disconnected from said engine; and reconnecting said load when at least one of a first group of events occurs that includes:

the throttle position returning to below a second position that is lower than said first position;

the vehicle speed reaches a second predetermined speed value that is greater than said first value; and said load is continuously disconnected for a period of time that exceeds a predetermined maximum disconnection period of time.

* * * * *